(12) United States Patent
Furment et al.

(10) Patent No.: US 9,789,403 B1
(45) Date of Patent: Oct. 17, 2017

(54) SYSTEM FOR INTERACTIVE IMAGE BASED GAME

(71) Applicants: Odile Aimee Furment, New York, NY (US); Isaac Segall, New York, NY (US)

(72) Inventors: Odile Aimee Furment, New York, NY (US); Isaac Segall, New York, NY (US)

(*) Notice: Subject to any disclaimer, the term of this patent is extended or adjusted under 35 U.S.C. 154(b) by 0 days.

(21) Appl. No.: 15/415,308

(22) Filed: Jan. 25, 2017

Related U.S. Application Data

(63) Continuation-in-part of application No. 15/182,560, filed on Jun. 14, 2016, now abandoned.

(51) Int. Cl.
*A63F 13/655* (2014.01)
*A63F 13/428* (2014.01)
*G06K 9/00* (2006.01)
*G06T 11/60* (2006.01)
*G06T 13/40* (2011.01)
*G06F 3/01* (2006.01)
(Continued)

(52) U.S. Cl.
CPC .......... *A63F 13/655* (2014.09); *A63F 13/213* (2014.09); *A63F 13/215* (2014.09); *A63F 13/428* (2014.09); *A63F 13/537* (2014.09); *A63F 13/63* (2014.09); *A63F 13/79* (2014.09); *G06F 3/017* (2013.01); *G06K 9/00228* (2013.01); *G06K 9/00744* (2013.01); *G06T 11/60* (2013.01); *G06T 13/40* (2013.01); *H04N 5/765* (2013.01); *A63F 2300/204* (2013.01)

(58) Field of Classification Search
CPC ...... A63F 13/213; A63F 13/215; A63F 13/60; A63F 13/63; A63F 13/655; A63F 13/79; A63F 2300/204
See application file for complete search history.

(56) References Cited

U.S. PATENT DOCUMENTS 5,595,389 A * 1/1997 Parulski ................. A63F 13/10
463/31
5,623,587 A   4/1997 Bulman
(Continued)

*Primary Examiner* — Dmitry Suhol
*Assistant Examiner* — David Duffy
(74) *Attorney, Agent, or Firm* — Seth Natter; Natter & Natter

(57) ABSTRACT

A method for real time processing of images providing a real time preview of face images for interaction with a game environment. Images from one or more image sensors are processed providing a modified image of a certain size and certain shape, for algorithmically detecting and tracking faces in the modified image for a real time preview of face images overlaid on a game environment. The real time preview of face images is configured for user control for interaction with the game environment. A facial gesture control functionality is disclosed for the execution of game commands allowing control of the real time preview of a face images for interaction with the game environment. The method of the present invention further discloses real time processing of images from a second image sensor for a real time preview of a second face images for interaction with the game environment. The present invention further discloses a method for real time processing of images from a first and second image sensor for a real time preview of face images overlaid on a real time preview of background images.

10 Claims, 12 Drawing Sheets

(51) Int. Cl.
*H04N 5/765* (2006.01)
*A63F 13/213* (2014.01)
*A63F 13/537* (2014.01)
*A63F 13/79* (2014.01)
*A63F 13/63* (2014.01)
*A63F 13/215* (2014.01)

(56) References Cited

U.S. PATENT DOCUMENTS

| | | | | |
|---|---|---|---|---|
| 6,677,967 B2* | 1/2004 | Sawano | ............... | G06T 19/20 715/716 |
| 7,048,630 B2* | 5/2006 | Berg | ............... | G07F 17/3206 463/16 |
| 7,285,047 B2* | 10/2007 | Gelb | ............... | A63F 13/12 345/419 |
| 8,803,912 B1* | 8/2014 | Fouts | ............... | G06T 19/006 345/629 |
| 9,492,750 B2* | 11/2016 | Barber | ............... | A63F 13/10 |
| 2009/0169168 A1 | 7/2009 | Ishikawa | | |
| 2009/0202114 A1* | 8/2009 | Morin | ............... | A63F 13/12 382/118 |
| 2010/0061695 A1* | 3/2010 | Furmanski | ............... | G11B 27/034 386/278 |
| 2010/0211918 A1* | 8/2010 | Liang | ............... | G06K 9/00335 715/863 |
| 2011/0216060 A1* | 9/2011 | Weising | ............... | G09G 5/08 345/419 |
| 2011/0225610 A1* | 9/2011 | Prieto | ............... | H04N 7/173 725/38 |
| 2012/0005595 A1* | 1/2012 | Gavade | ............... | G11B 27/034 715/751 |
| 2012/0081282 A1* | 4/2012 | Chin | ............... | G06F 3/011 345/156 |
| 2012/0120186 A1 | 5/2012 | Diaz | | |
| 2013/0023337 A1* | 1/2013 | Bowers | ............... | G07F 17/32 463/25 |
| 2013/0120602 A1* | 5/2013 | Huang | ............... | H04M 1/72522 348/218.1 |
| 2013/0194428 A1 | 8/2013 | Chao | | |
| 2013/0201105 A1* | 8/2013 | Ptucha | ............... | G06F 3/017 345/158 |
| 2014/0364241 A1* | 12/2014 | Oku | ............... | A63F 13/655 463/43 |
| 2015/0237268 A1 | 8/2015 | Vaiaoga et al. | | |
| 2016/0071491 A1 | 3/2016 | Berryman | | |
| 2016/0136516 A1* | 5/2016 | Hooke | ............... | A63F 13/213 463/34 |

* cited by examiner

SYSTEM FOR INTERACTIVE IMAGE BASED GAME

FIELD OF INVENTION

The present disclosure generally relates to a computer implemented method and system for an interactive image based game for previewing images of a face to interact with a game environment.

BACKGROUND

Recently, the popularity of mobile computing devices has led to an explosion of game applications worldwide. In the past, game applications were limited due to the software and hardware restrictions. The wide array of technological improvements in memory, displays, network bandwidth, processors, graphic processing units, cameras, and operating systems for mobile computing devices, have enabled game applications to operate in ways like never before. Unfortunately, popular game applications today do not fully utilize the mobile technological advances in software and hardware, nor are they able to include users in such a way that allows for an immersive gaming experience. Thus, what is needed is a new method and system that utilizes a mobile computing device's software and hardware to visually include the user, more particularly the user's face, and to visually include images of a real world environment from a user's perspective, for active participation and interaction during a game.

SUMMARY

The example embodiments described herein are directed to a method and a system for an interactive image based game for previewing images of a face in real time to interact with a game environment. The computer-implemented method comprises: providing one or more game environments comprising images; providing images of one or more objects from one or more front image sensors; processing the images from the front image sensor to generate modified images of a certain size and certain shape and overlaying the modified images onto the game environment; displaying a preview of the modified images in real time overlaid on the game environment; algorithmically detecting a face within the modified images; and tracking the detected face within the modified images to preview face images in real time overlaid on the game environment; and controlling the face images to interact with the game environment during gameplay.

In one or more embodiments, the one or more game environments are stored in a memory, wherein the control of the face images is by at least one user or by instructions stored in the memory.

In one or more embodiments, the method further comprises: receiving a command to display one or more avatar graphics stored in a memory; displaying the avatar graphic attached to the face images overlaid on the game environment in response to the command; and controlling the avatar graphic attached to the face images to interact with the game environment.

In one or more embodiments, the method further comprises: providing an exemplar database of references stored in a memory; acquiring a user performed gesture from the front image sensor; comparing the user performed gesture to the exemplar database of references; and accepting or rejecting the user performed gesture as a command for control of the face images; and controlling the face images through the accepted user performed gesture.

In one or more embodiments, the method further comprises: receiving a command to video record the face images overlaid on the game environment; video recording the face images overlaid on the game environment in response to the command; and storing the video recording.

In one or more embodiments, the method further comprises: providing images of a real world environment from one or more rear image sensors; wherein the game environment comprises the images of the real world environment.

In one or more embodiments, the method further comprises: receiving a command for the recognition of one or more objects in the images of the real world environment; algorithmically recognizing the objects in the images of the real world environment in response to the command; wherein the each recognized object corresponds to one or more graphics stored in a memory, displaying the graphics overlaid on the images of the real world environment in response to the recognized object; controlling the displayed graphics to interact with the face images and the images of the real world environment during gameplay.

In one or more embodiments, the method further comprises: receiving a command to video record the face images overlaid on the images of the real world environment; video recording the face images overlaid on the images of the real world environment in response to the command; and storing the video recording.

In one or more embodiments, the method further comprises: providing one or more preexisting videos stored in a memory; wherein the game environment comprises one or more preexisting videos.

In one or more embodiments, the method further comprises: receiving a command for the recognition of one or more objects in the preexisting video; algorithmically recognizing the objects in the preexisting video in response to the command; wherein the each recognized object corresponds to one or more graphics stored in a memory, displaying the graphics overlaid on the preexisting video in response to the recognized object; controlling the displayed graphics to interact with the face images and the preexisting video during gameplay.

In accordance with another aspect of the embodiments described herein, there is provided a mobile computerized system comprising a central processing unit and a memory, the memory storing instructions for: providing one or more game environments comprising images; providing images of one or more objects from one or more front image sensors; processing the images from the front image sensor to generate modified images of a certain size and certain shape and overlaying the modified images onto the game environment; displaying a preview of the modified images in real time overlaid on the game environment; algorithmically detecting a face within the modified images; and tracking the detected face within the modified images to preview face images in real time overlaid on the game environment; and controlling the face images to interact with the game environment during gameplay.

In one or more embodiments, the one or more game environments are stored in a memory, wherein the control of the face images is by at least one user or by instructions stored in the memory.

In one or more embodiments, the memory further stores instructions for: receiving a command to display one or more avatar graphics stored in a memory; displaying the avatar graphic attached to the face images overlaid on the game environment in response to the command; and controlling the avatar graphic attached to the face images to interact with the game environment.

In one or more embodiments, the memory further stores instructions for: providing an exemplar database of references stored in a memory; acquiring a user performed gesture from the front image sensor; comparing the user performed gesture to the exemplar database of references; and accepting or rejecting the user performed gesture as a command for control of the face images; and controlling the face images through the accepted user performed gesture.

In one or more embodiments, the memory further stores instructions for: receiving a command to video record the face images overlaid on the game environment; video recording the face images overlaid on the game environment in response to the command; and storing the video recording.

In one or more embodiments, the memory further stores instructions for: providing images of a real world environment from one or more rear image sensors; wherein the game environment comprises the images of the real world environment.

In one or more embodiments, the memory further stores instructions for: receiving a command for the recognition of one or more objects in the images of the real world environment; algorithmically recognizing the objects in the images of the real world environment in response to the command; the each recognized object corresponds to one or more graphics stored in a memory, displaying the graphics overlaid on the images of the real world environment in response to the recognized object; controlling the displayed graphics to interact with the face images and the images of the real world environment during gameplay.

In one or more embodiments, the memory further stores instructions for: receiving a command to video record the face images overlaid on the images of the real world environment; video recording the face images overlaid on the images of the real world environment in response to the command; and storing the video recording.

In one or more embodiments, the memory further stores instructions for: providing one or more preexisting videos stored in a memory; wherein the game environment comprises one or more preexisting videos.

In one or more embodiments, the memory further stores instructions for: receiving a command for the recognition of one or more objects in the preexisting video; algorithmically recognizing the objects in the preexisting video in response to the command; wherein the each recognized object corresponds to one or more graphics stored in a memory, displaying the graphics overlaid on the preexisting video in response to the recognized object; controlling the displayed graphics to interact with the face images and the preexisting video during gameplay.

BRIEF DESCRIPTIONS

The embodiments herein presented, comprise and form elements of this specification used as an example of the present invention, and together with descriptions explain and illustrate the principles of the invention herein presented:

DETAILED DESCRIPTIONS OF EXAMPLE EMBODIMENTS

Figure 1:
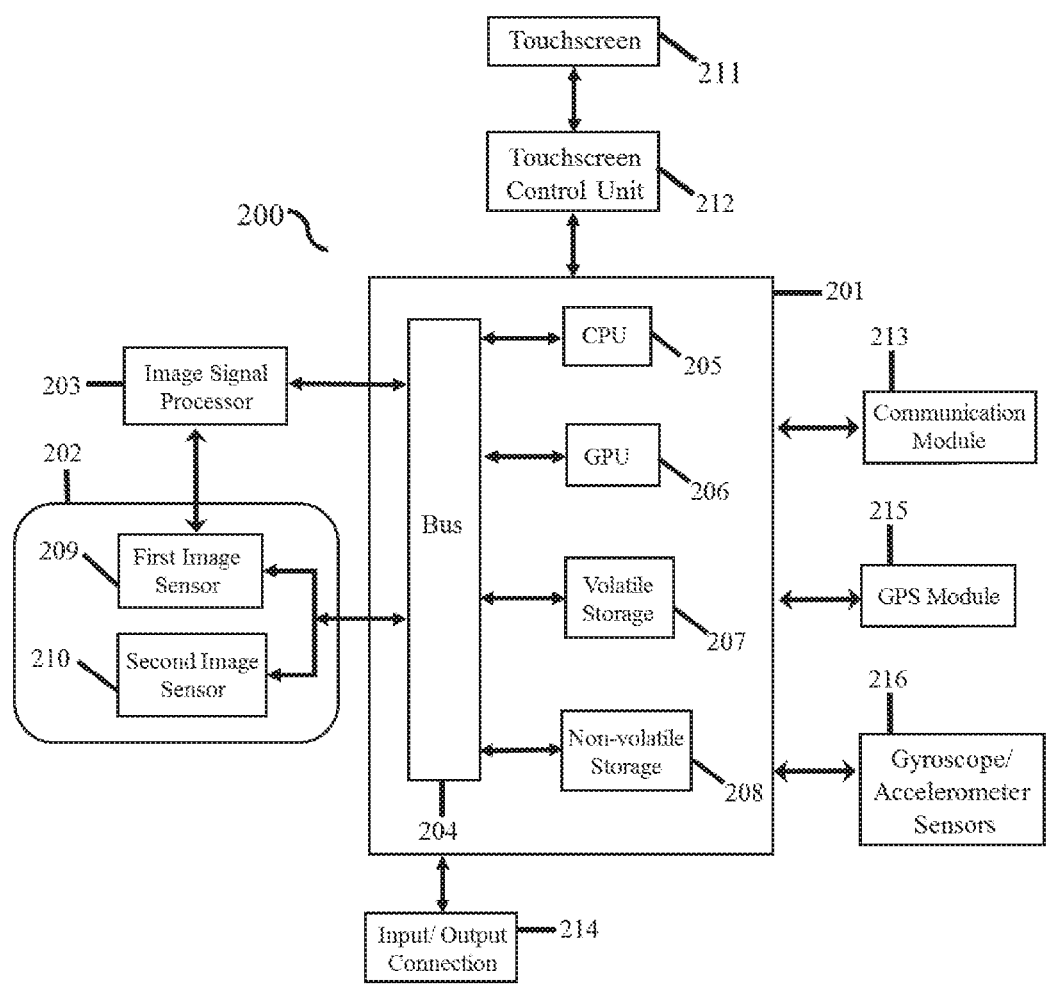
FIG. 1 illustrates a block diagram of an exemplar mobile computing device upon which the techniques described herein may be implemented.

The implementation of the present disclosure provides sufficient detail to enable one skilled in the art to practice the invention, and to appreciate the fact that other methodologies, steps, structures, and/or substitutes of various elements, may be utilized without departing from the scope and spirit of the present invention, therefore the following detailed description is not to be construed in a limited sense.

In the following detailed descriptions herein presented, reference will be made to the embodiments in which identical functionalities are designated with like reference numerals. The features described and/or illustrated with respect to the embodiments are not necessarily drawn to scale and may be used in the same or in a similar way in one or more embodiments. Although the method and description of embodiments and diagrams may show specific sequence for executing the steps, the order of the steps may be modified by for example, user interaction, and should not limit the scope and spirit of the present invention.

It should be understood the terms like "face", "user's face", "face images" as referred and described respectively in detail in the present invention, refers to a human face found in the anterior surface of the head and is further connected to the neck. The face, referred to as the front of the human head includes several distinct areas, forehead comprising skin beneath the hairline, eyes, ears, mouth, nose, cheeks, chin, and facial muscles allowing for the expression of emotions. The term "interaction" may refer to mutual or reciprocal action or influence, or may refer to any kind of action that occurs as two or more objects have an effect upon one another. The term "real time" may also sometimes be referred to as live, and may refer to the actual time during which something takes place. The term, "feature reference points", may be referred to as nodes, points, and reference points, and the term, "executable code" may also be referred to as executable file, executable, or executable program, enabling a computer to perform indicated tasks according to encoded instructions. In general, a file containing instructions, such as bytecode, for a software interpreter may be considered executable or a scripting language source file may be considered executable in this sense. It should be further understood, terms like "front", and "rear", may be used herein to describe a variety of elements, layers, and/or components, these elements, layers, and/or components should not be limited by these terms. These terms are only utilized to distinguish one element, layer, and/or component from another element, layer, and/or component. Thus, a front element, layer, and/or component may be termed a rear element, layer, and/or component without departing from the scope and spirit of the present invention. The terms "comprising" and "comprises" when used in the detailed specifications, specify the presence of stated steps, elements, features, and operations, but may not exclude the presence or addition of one or more other steps, elements, features, and operations. Additionally, the phrase, "execution of logical instructions" may be referred to as performing machine code or machine language for a specific task on the central processing unit. It should be noted, all terms, including technical and scientific terms used herein, unless otherwise defined, have the same meaning as commonly understood by one skilled in the art to which this present invention belongs. Further it should be noted, that terms as defined in a variety of commonly used dictionaries should be interpreted as having a meaning that is consistent with their meaning in the context of the relevant art and will not be interpreted in an idealized or excessively formal sense unless specifically and/or otherwise defined herein.

The terminologies, drawings, and symbols used to describe and illustrate the various embodiments presented herein are not intended, nor shall they be interpreted, in a limited or a restrictive manner as detailed and utilized in the specific embodiment examples herein provided.

FIG. 1 is a block diagram illustrating the configuration of an exemplar electronic mobile computing device upon which the present invention may be implemented according to one or more embodiments. The electronic mobile computing device described herein may constitute any electronic device that has one or more displays, one or more cameras, and one or more image sensors. The mobile computing device may also be referred to as a communication terminal, a computing device, a mobile terminal, for example mobile computing device may be a portable gaming electronic device, a smartphone, personal media user (PMP), a tablet computer, a notebook computer, a display device, a laptop, a personal digital assistant (PDA), or any similar electronic computing device. Moreover, any other electronic computing device for example, a desktop computer, a head mount device, and a game console, equipped or coupled to one or more cameras that have one or more image sensors, and equipped or coupled to a display screen, may be used to practice and implement the present invention. The electronic mobile computing device, and the aforementioned computing devices may be coupled to or may be equipped with various types of peripheral input devices for the practice of the present invention, for example, at least one, keyboard, keypad, camera and image sensor, touchpad, pointing device, touchscreen control unit, virtual keyboard, joystick, mouse, wireless control unit, gun control unit, pad control unit, trackball, directional pad, analog stick, motion sensing control unit, and rhythm game control unit. In some embodiments of the present invention, a display screen is illustrated as representative example of the electronic mobile computing device.

The mobile computing device 200 may include a control unit 201, an image sensor module 202, and an image signal processor (ISP) 203, a touchscreen 211, a touchscreen control unit 212, a communication module 213, input device 214, a GPS module 215, and a gyroscope/accelerometer sensor 216. The control unit 201 in this example, may include a bus 204, or other connectors or set of wires, allowing the communication of information and data, the transfer of information and data among a variety of parts and components inside the mobile computing device 200 or between computing devices. One or more central processing units 205 (CPU), also known as a processor or microprocessor, coupled with bus 204, is the electronic circuitry within a computing device, in this example a mobile computing device, which may be used for processing information, and carrying out instructions and tasks. One or more graphics processing units (GPU) 206 coupled with bus 204, may be used for quickly manipulating and altering memory allowing the acceleration of images, created in a frame buffer, for real time output to a screen, in this example, the touchscreen 211, and used for real time rendering of graphics, images, and video. Volatile memory 207, for example a random access memory (RAM) or main memory, may be coupled to bus 204, and may be used for temporarily storing information that is required for running programs, and software applications. The mobile computing device 200 may also include non-volatile memory 208, such as a read only memory (ROM) or erasable programmable read-only memory (EPROM), or any other static storage device coupled to bus 204, used for storing firmware, software, and may store a game application, providing the control, monitoring, and data manipulation of the mobile computing device 200. The touchscreen control unit 212 is configured to detect user's touch gestures to a relative position, and send the information based on user's touch gestures, performed on the touchscreen 211, via bus 204, to the central processing unit 205 allowing the control unit 201 to initiate or execute instructions, programs, software, and applications which may be stored in non-volatile storage 208 and/or volatile storage 207. The touchscreen 211 coupled with bus 204, is an output device used for displaying information and images in a real time visual form. The mobile computing device 200 may include one or more communication modules 213, coupled to the bus 208, for connecting to a computer network via the internet or LAN network, utilizing for example, a wireless link also commonly referred to as WI-FI and the 802.11 families, and a wireless link Bluetooth may also be used for network connection, for interface with one or more host processors or with one or more network servers supporting multiple receive and transmit queues, and allowing the mobile computing device 200, to send and receive data and requests including, but not limited to, program code, instructions, or software, and further allowing the host processors or network servers to send and receive data and requests for an application program running on the mobile computing device 200 for example, via the internet or LAN network. The input/output connection (i/o)

214 may connect any device that transfers data to or from the mobile computing device for example, a storage device, a camera, a keyboard, display screen, and various aforementioned peripheral input devices. The GPS module 215, may be referred to as (global positioning system) or as a GPS receiver, connected the bus 204 for receiving information from GPS satellites, cell towers, or cell sites and further calculate the mobile computing device's 200 geographical location. The gyroscope/accelerometer sensors 216, may be referred to as a tilt sensor, connected the bus 204, to detect the position, rotation, level, tilting, or orientation of the mobile computing device 200.

The image sensor module 202 coupled to bus 204, may include one or more front image sensors 209 and one or more rear image sensors 210. The front image sensor 209 and the rear image sensor 210, for example, may be a complementary metal-oxide semiconductor (CMOS) image sensor or a charge-coupled device image sensor (CCD), providing camera capabilities allowing a user to capture still images or capture video with the mobile computing device 200. The front image sensor 209 and the rear image sensor 210 in conjunction with the central processing unit 205 located in the control unit 201, directly converts an optical image to a digital image. Furthermore, the image sensor module 202 may include a variety of camera components, not depicted, such as one or more camera lenses, an aperture, flash unit, one or more lens barrel, and one or more camera motors, and etc.

The mobile computing device 200 may include an image signal processor (ISP) 203 coupled to bus 204, which may receive real time images captured by the front image sensor 209 and/or the rear image sensor 210, and processes the images to fit desired visual specifications, for example, size, quality, resolution, for display of processed images. The image signal processor (ISP) 203 may be used for sequentially processing the image data received in a Bayer array signal from the front image sensor 209 and from the rear image sensor 210, and may process images for noise removal, image scaling, interpolation, gamma correction, spatial changes, and other corrective functions to produce and convert an image into a format for display on a screen, for example the touchscreen 211. The control unit 201 controls the image sensor module 202 and the image signal processor (ISP) 203 enabling the execution of image processing.

Figure 2:
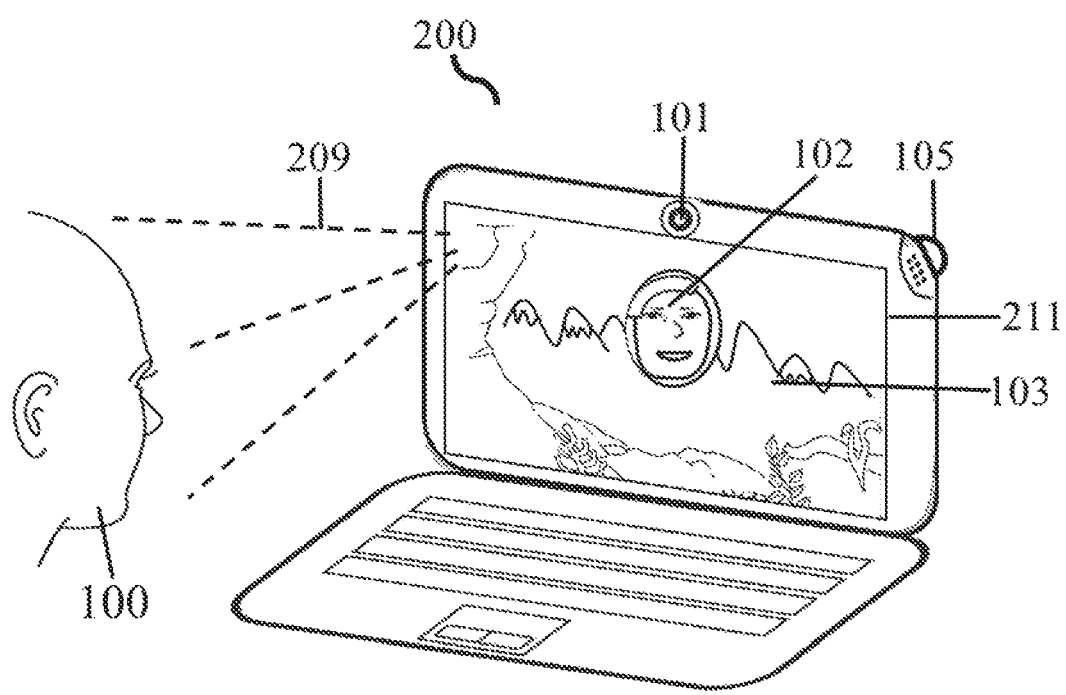
FIG. 2 is an abstract illustration of an exemplar mobile computing device capturing images of a user and displaying a preview of face images within a game environment.

FIG. 2 illustrates an exemplar mobile computing device capturing images of a user and displaying a preview of face images within a game environment on a screen. In this example, the game application has been initiated, and the mobile computing device 200 receives instructions to provide one or more game environments 103 comprising images, such as computer graphics and digital images, such as, 2D graphics, sprite graphics, raster graphics, bit mapped graphics, vector graphics, 3D graphics, live images or real time image frames from a one or more sensors, and images stored in a memory such as one or more preexisting videos. The mobile computing device receives instructions to provide images of one or more objects 100 from one or more front image sensors 209 of one or more front cameras 101. The game environment 103 may be stored in the mobile computing device's memory for example the non-volatile memory, or may be stored in one or more host processors or one or more network servers. The game environment may also be presented in various perspectives such as isometric perspective, top-down perspective, which may be referred to as overhead view, side-scrolling, which may be referred to as parallax-scroller, two and a half dimension and may include a variety of object graphics, terrains, textures, and scenes. The game environment 103 may also be one or more combinations of the aforementioned graphics and digital images.

Further, the mobile computing device 200 processes the images of one or more objects 100 from one or more front image sensors 209 to preview face images 102 in real time overlaid on the game environment 103 on a screen, such as the touchscreen 211. During gameplay, the user may reasonably adjust their own body positioning or head positioning relative to the mobile computing device 200 and more specifically the front camera 101 and the front image sensor 209 for a consistent real time capture of the user's face. For example, the user may rotate, move, tilt, distance the mobile computing device 200, such as a smartphone, closer to or further from their face during gameplay.

Alternatively, the mobile computing device 200 may receive instructions to process images of a real world environment form one or more rear image sensors of one or more rear cameras 105 for the preview of face images overlaid on images of a real world environment in real time during gameplay. It will be appreciated and understood by one skilled in the art that the present disclosure of the invention should not be limited to a certain kind or type of game environment, which may also be referred to as a digital game environment, a game world, or a virtual environment, and further various kinds or types of game environments may be utilized for the implementation of the present invention.

Figure 3:
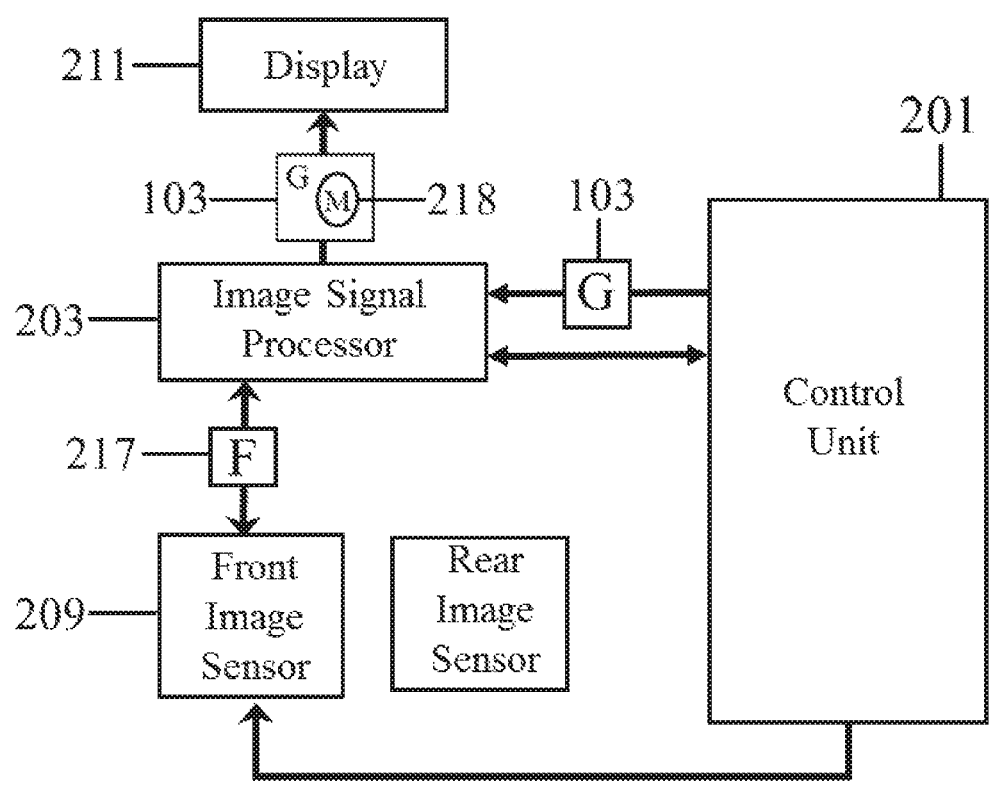
FIG. 3 is a block diagram illustrating processing of images for previewing face images in real time overlaid on a game environment according to one or more embodiments of the present invention.

FIG. 3 is a block diagram illustrating an exemplar configuration of components of a mobile computing device for processing of images for previewing images of a face within a game environment for interaction according to one or more embodiments of the present invention. When the game application is initiated or during gameplay, the control unit 201 receives instructions stored in a memory, or may receive a transmission of instructions stored in one or more host processors or one or more network servers, to provide one or more game environments 103 comprising images stored in the memory, or which may be stored in the host processors or the network servers, and to activate one or more front image sensors 209, which may be activated automatically or activated by a user, providing images of one or more objects from the one or more front image sensors 209, such as a real time video or real time image frames. In this example, the front image sensor 209 sends the image signal output 217, comprising an entire range of pixels, to the image signal processor 203. The image signal processor 203 processes and sends output pixel information to the control unit 201 for the control unit 201 to analyze the pixel information received, and to provide instructions to the image signal processor 203 for the processing of the images 217, comprising the entire range of pixels, to generate modified images of a certain size and a certain shape such that a face may be detected and tracked within the generated modified images, to fit desired characteristics for display of the modified images within the game environment, for example, automatic focusing (AF), resolution, image effects, filtering, image scaling, automatic exposure (AE), noise reduction, high dynamic range (HDR), spatial changes, and etc. The image signal processor 203 further receives instructions from the control unit 201, and may overlay the generated and processed modified images 218, semi-transparently, opaquely, or partially, onto the game environment 103 for output display. The touchscreen 211 displays a preview of the modified images in real time overlaid on the game environment, processed by the image signal processor 203.

The control unit 201 further sends instructions to algorithmically detect a face within the modified images for example, by detecting and assessing feature reference points of the one or more objects within the modified images, and to algorithmically track the detected face within the modified images for example, by aligning the feature reference points of the detected face across the modified images to preview face images in real time overlaid on the game environment. The face images is controlled for interaction with the game environment either by the user control or may be controlled automatically by instructions stored in the control unit's 201 memory.

It should be noted, the modified images may be processed for a variety sizes, for example, smaller than the game environment, and for a variety of shapes for example, oval, circle, square, or any other shape, and further may be partially or fully enclosed within an opaque, semi-transparent, or transparent graphic(s), or the modified images may be embedded in/or within a graphic or embedded in/or within the game environment, for example, depending on the gameplay and the mobile computing device's screen orientation. Lastly, the modified images and the game environment may be processed to generate combined images for display. It should be further noted, the images processed to generate modified images as disclosed herein, may be 3D modified images and spherical modified images from one or more front image sensors.

Furthermore, in response for failing to detect a face, the algorithm may continue to assess feature reference points of one or more objects within the modified images by instructions stored in the mobile computing device's memory, for a preview of one or more objects within the modified images in real time overlaid on the game environment until a face is detected and further the modified images may be controlled for interaction with the game environment by the user control or automatically by instructions stored in the memory. While the present embodiment describes a method for the algorithmic facial detection and tracking, it is to be understood by one skilled in the art, that a variety of methods may be utilized for facial detection and facial tracking inclusive of, but not limited to, KLT algorithm method, appearance based methods, Viola-Jones method, image pattern method, and intensity based algorithms.

Figure 4:
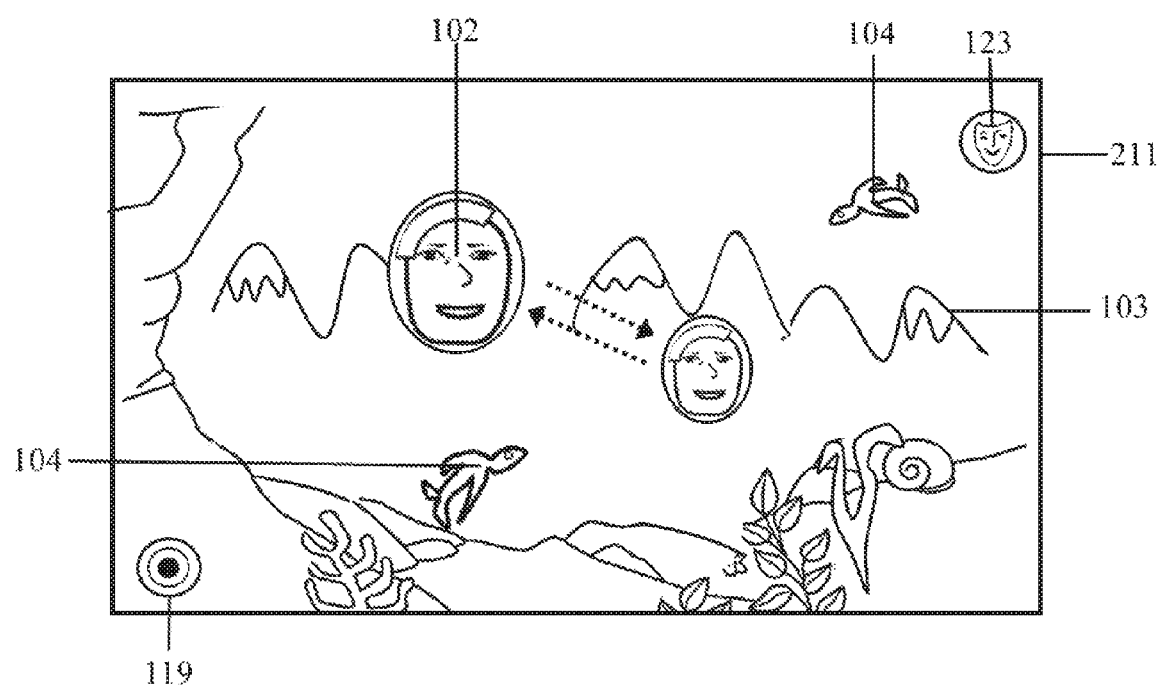
FIG. 4 illustrates face images interacting with the game environment during gameplay according to one or more embodiments of the present invention.

FIG. 4 illustrates a preview of face images interacting with the game environment during gameplay. In this example, the touchscreen 211 displays the preview of face images 102 overlaid on the game environment 103. The game environment 103 interacts with the face images 102, by instructions stored in the mobile computing device's memory and/or stored in one or more network servers or one or more host processors, by presenting for example, challenges, obstacles, and/or adventures that may require a user inputted response or may require an automatic response for overcoming the said challenges, obstacles, and/or adventures. The game environment 103 may include a variety of elements, such as one or more object graphics 104, which may be partially overlaid on the game environment 103, to interact with the face images and may interact with the game environment 103. The user may control the face images 102 by performing simple or multi-touch gestures or utilizing a stylus on the mobile computing device's touchscreen 211 for interaction with the game environment 103, or by utilizing the mobile computing device's gyroscope/accelerometer sensors by tilting and/or rotating the mobile computing device for interaction with the game environment 103, or by the user selecting the gesture controller functionality 123, which may be automatically selected by instructions stored in the memory, to perform one or more facial and/or head gestures for the execution of commands to control the face images 102 for interaction with the game environment 103.

In this example, gameplay comprises movement, positioning, and sizing of the face images 102, presumably to avoid collision with a sea creature, illustrated as the object graphic 104 and "gain" points, or to collide with the object graphic 104 and "lose" points. Another example of gameplay comprises the face images 102 navigating within the game environment 103, illustrated as an ocean, and battling sea creatures in attempt to discover treasures to "gain" points. The mobile computing device may initiate speakers for audio output such as game sounds or music.

Further, this embodiment illustrates a record functionality 119, requested by a user, or which may be requested automatically by instructions stored in the mobile computing device's memory. The user selected record functionality 119 sends a command to initiate, simultaneously or with a time difference, the mobile computing device's video recording of images, and audio recording utilizing the mobile computing device's microphone to video record the face images 102 from the front image sensor and the game environment 103, displayed on the screen, such as the touchscreen 211. Additionally, the video recording may record the gameplay, such as the face images 102 interacting with the game environment 103, which may include object graphics 104, one or more avatar graphics, and etc. The video recording is terminated by a user request, or by a request automatically, for example by the user reselecting the record functionality 119 to send a command to the mobile computing device, to store the video recording in mobile computing device's memory, or alternatively the video recording may be stored in one or more network servers or one or more host processors utilizing the mobile computing device's communication module for connection to the internet or an LAN for transmission of the recorded video to the network server or host processor.

It should be noted, that the mobile computing device's touchscreen control, gyroscope/accelerometer control, and facial and head gesture control are merely examples for the control of the aforementioned, and a variety of methods and/or input devices may be used as disclosed previously in one or more embodiments. Furthermore, it will be appreciated by one skilled in the art that the gameplay herein described and the interaction as described herein are merely examples and should not limit the scope and spirit of the present invention.

Figure 5:
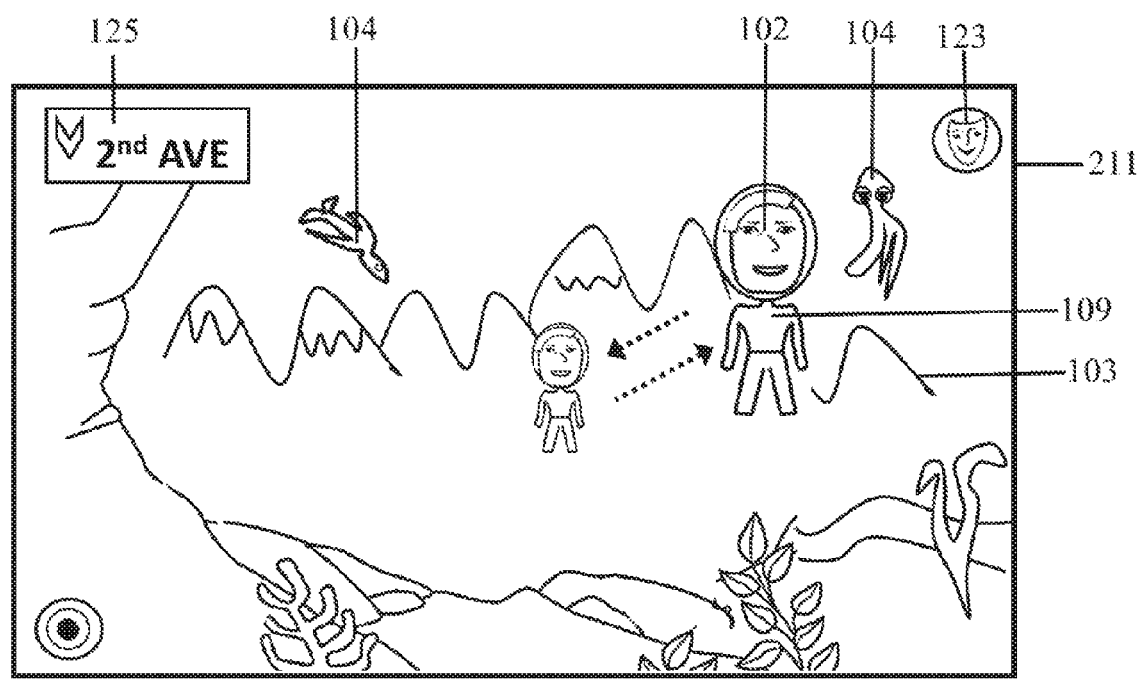
FIG. 5 illustrates an avatar graphic attached to face images interacting with the game environment during gameplay according to one or more embodiments of the present invention.

FIG. 5 illustrates an avatar graphic displayed attached to the preview of user's face images and interaction with the game environment. At any point in time during gameplay, the mobile computing device may receive a command to display one or more avatar graphics 109 attached to the face images 102 either by a request from a user or an automatic request by instructions stored in the memory. In this example, the mobile computing device has received the command and has processed the received command to retrieve one or more avatar graphics stored in the mobile computing device's memory, or stored in one or more host processors, or stored in one or more network servers, and displays by instructions stored in the memory, the avatar graphic 109 attached to the face images 102 which may be partially overlaid on the game environment 103 on the screen, such as touchscreen 211. Alternatively, the mobile computing device may automatically by instructions stored in the memory, determine its GPS location utilizing for example, the GPS module. Once the mobile computing device determines its GPS location, it may transmit GPS locational information, utilizing for example, the communication module to connect to the internet, for interface with one or more host processors or one or more network servers. In response to said transmission of the GPS locational information to the host processors or network servers, the mobile computing device may receive images and/l or data stored in the host processors or the network servers, inclusive of, but not limited to, one or more graphics, such as an avatar graphic 109 which may be relative or specific to the mobile computing device's GPS locational information 125 displayed on the touchscreen 211. For example, the mobile computing device's receipt of images and/or data may display an avatar graphic 109 attached to face images 102 overlaid on the game environment 103 on the touchscreen 211, by instructions stored in the memory.

The displayed avatar graphic 109 attached to face images 102 overlaid on the game environment 103 is user controlled, or alternatively may be controlled automatically by instructions stored in the memory, for interaction with the game environment 103 and/or with object graphics 104. In this example, the face images 102 attached to the avatar graphic 109 has been moved, repositioned, and resized by the user control to, for example, navigate within the game environment 103, and collide with the object graphics 104 during gameplay. Additionally, the user may select the gesture controller functionality 123, or said functionality may be automatically selected, permitting the user to perform one or more facial and/or head gestures for the execution of commands to control the face images 102 attached to an avatar graphic 109 for interaction with the game environment 103. Although the avatar graphic 109 illustrated has the form of a body, the graphic may be of any shape or form, and may further have associated movements depending on gameplay or options.

Figure 6:
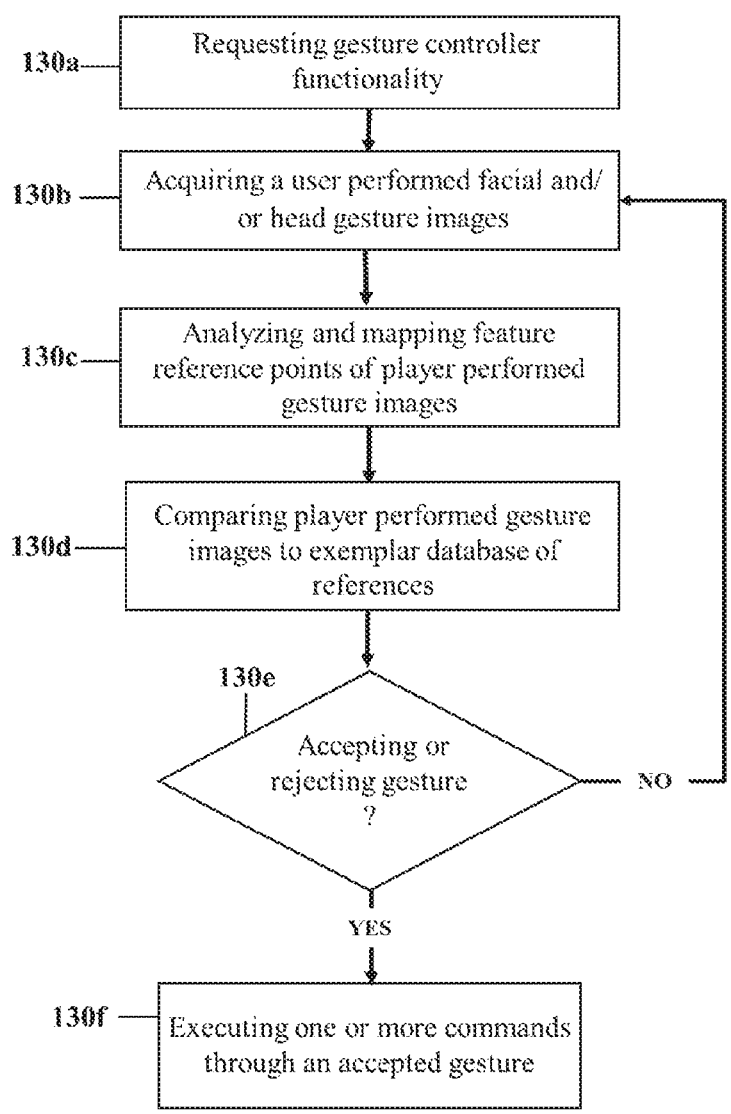
FIG. 6 is a flowchart diagram illustrating the algorithmic recognition of a user performed gesture according to one or more embodiments of the present invention.

FIG. 6 is a flowchart diagram illustrating a method for algorithmic recognition of a user performed facial and/or head gesture for the execution of one or more commands to control the face images for interaction with the game environment. At any given point in time, the gesture controller functionality may be activated, by a user request, or an automatic request, sending a command to the mobile computing device permitting the user to perform an accepted facial and/or head gesture for the execution of one or more commands, stored as instructions in the mobile computing device's memory, or stored in one or more network servers, for control of the face images. The flowchart herein depicts the request of the gesture controller functionality 130a for the mobile computing device to acquire one or more user performed facial and/or head gestures images from one or more front image sensors 130b. The acquired images and information may be temporarily stored in the mobile computing device's memory, or in one or more network servers. Algorithmically analyzing and mapping feature reference points of the user performed facial and/or head gestures images 130c, and comparing the user performed facial and/or head gesture images to a provided exemplar database of references 130d stored in the mobile computing device's memory, or in the one or more network servers. Further, accepting or rejecting the user performed one more facial and/or head gestures images 130e. If rejected the user is prompted to perform another facial and/or head gesture. If accepted, executing one or more commands 130f through the one or more accepted facial and/or head gestures to control the face images during gameplay.

It should be noted that the exemplar database of references comprises images and information, such as, opening eyes gesture, closing eyes gesture, raising or lowering eyebrows gesture, opening mouth gesture, closing mouth gesture, smiling gesture, frowning gesture, tilting of the head vertically or horizontally, and nodding of the head. While the present embodiment describes a method for algorithmic recognition, it is to be understood by one skilled in the art, that this is merely one example and various methods for algorithmic recognition may be utilized such as, appearance-based models, skeletal-based model, and 3D-based models.

Figure 7:
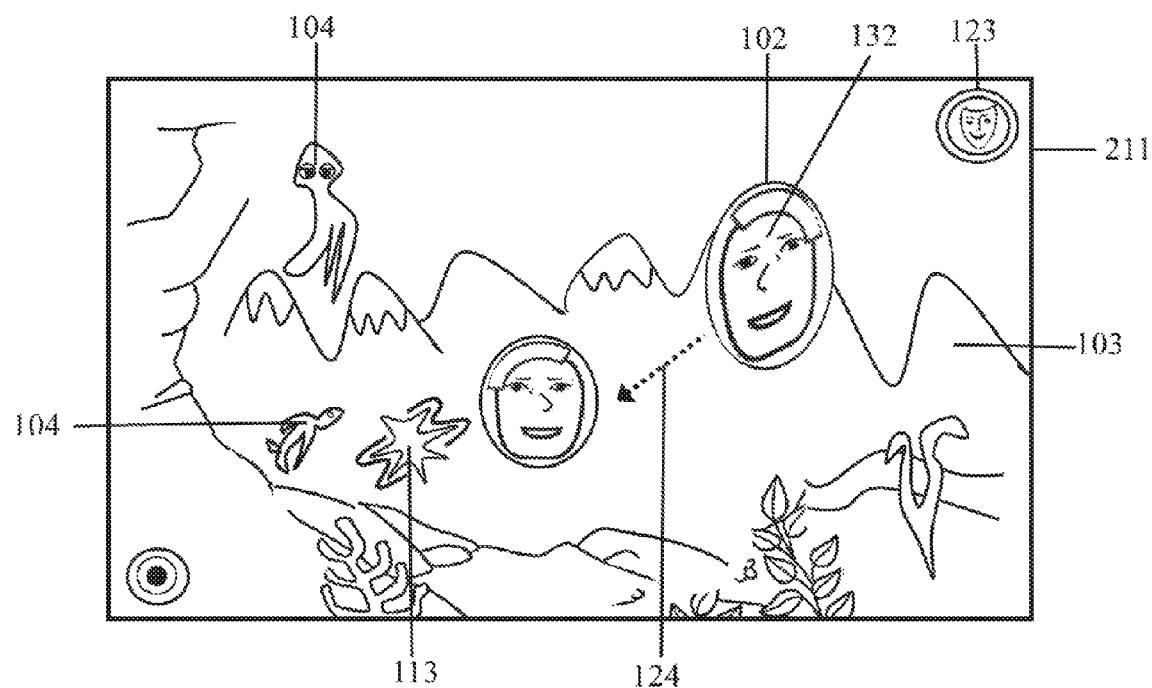
FIG. 7 illustrates gesture control of the face images and interaction with the game environment during gameplay according to one or more embodiments of the present invention.

FIG. 7 this embodiment illustrates gesture control of the face images and interaction with the game environment. In this example, a gesture controller functionality 123 has been requested by a user and the mobile computing device receives a command to initiate the gesture controller functionality 123, for the user to perform one or more facial and/or head gestures, as shown in the preview of face images 102 displayed on the touchscreen 211, for the execution of one or more commands, during gameplay. In this instance, the mobile computing device has acquired a user performed gesture 132, a right tilt of the head gesture, and feature reference points of the user performed gesture 132 are analyzed and mapped, and then compared to the exemplar database of references stored in the mobile computing device's memory, or alternatively may be stored in one or more host processors or in one or more network servers, to accept or reject the user performed gesture 132 and to execute one or more commands through an accepted user performed gesture 132. In this instance, the executed command 124, represented as an arrow, has controlled, for example the positioning and sizing of the face images 102 to interact with the game environment 103, such as to avoid collision, or to collide against the one or more object graphics 104 during gameplay. The executed command 124 may also control the object graphics 104 to interact with the face images 102 and the game environment 103. Further, the executed command 124 may display one or more graphics 113 stored in the mobile computing device's memory or may be stored in one or more network servers, to for example, interact with the face images 102 and with the game environment 103 inclusive of the object graphics 104 during gameplay.

It should be noted that the aforementioned user performed head gesture, a right tilt of the head, is merely an example of what may be algorithmically detected and recognized during the gameplay, further the execution of the aforementioned command, positioning and sizing, is merely an example of the control of the face images for interaction with the game environment, and a variety of gestures and commands may be utilized for the implementation of the present invention.

Figure 8:
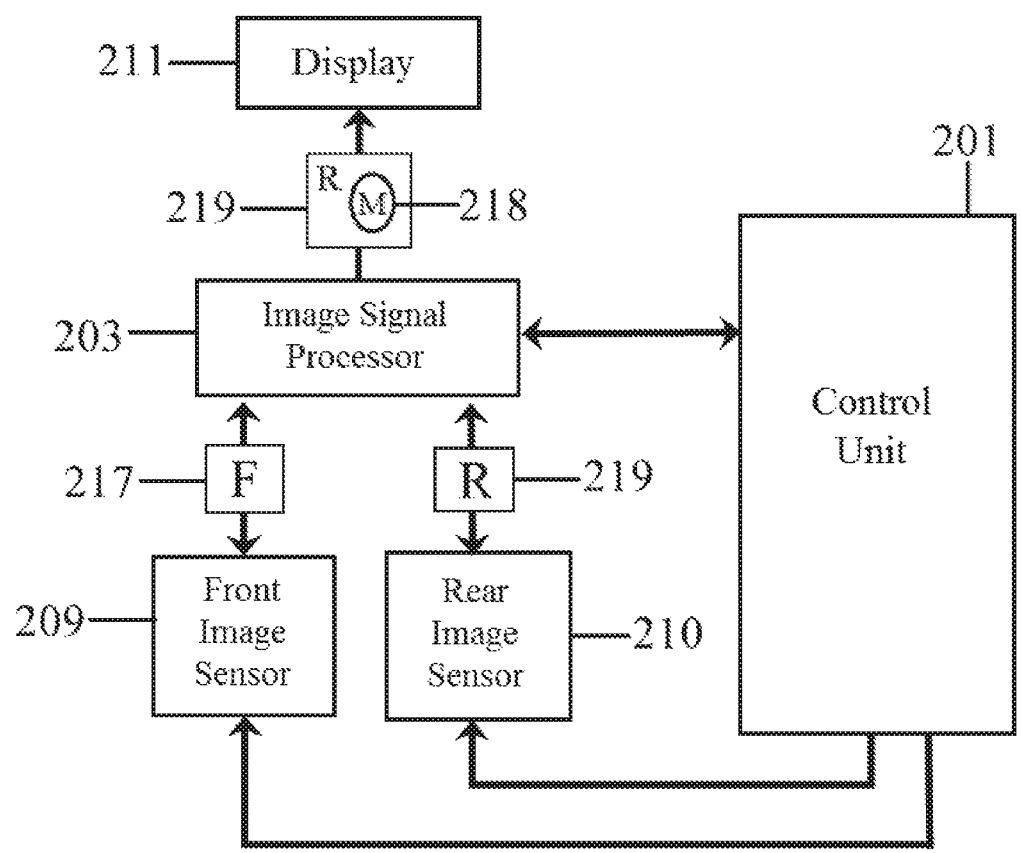
FIG. 8 is a block diagram illustrating processing of images for previewing face images overlaid on images of a real world environment in real time according to one or more embodiments of the present invention.

FIG. 8 is a block diagram illustrating an exemplar configuration of the mobile computing device for for processing of images for previewing images of a face overlaid on images of a real world environment in real time for interaction according to one or more embodiments of the present invention. When the game application is initiated or during gameplay, the control unit 201 receives instructions stored in a memory, or may receive a transmission of instructions stored in one or more host processors or one or more network servers, to activate one or more front image sensors 209, simultaneously or with a time difference, or in any order required, activate one or more rear image sensors 210, providing images of one or more objects from one or more front image sensors 209 and providing images of a real world environment from one or more rear image sensors 210, such as a real time video or real time image frames. The front image sensor 209 may send a front image signal output 217 and the rear image sensor 210 may send a rear image signal output 219, comprising an entire range of pixels respectively from each, to the image signal processor 203 for the image signal processor 203 to process the front and rear image signal outputs and send the front output pixel information and the rear output pixel information to the control unit 201 for the control unit 201 to analyze the front and the rear pixel information received, and to provide instructions to the image signal processor 203 for the processing of the images 217, comprising the front entire range of pixels to generate modified images of a certain size and a certain shape such that a face may be detected and tracked within the generated modified images and further processing the generated modified images and the images of the real world environment 219, comprising the rear entire range of pixels, to fit desired characteristics for display, for example automatic focusing (AF), resolution, image effects, filtering, aspect ratio, image scaling, automatic exposure (AE), noise reduction, high dynamic range (HDR), spatial changes, and etc. The image signal processor 203 further receives instructions from the control unit 201, and may overlay, simultaneously or with a time difference, the generated and processed modified images 218, semi-transparently, opaquely, or partially, onto the images of the real world environment 219, for output display. The touchscreen 211 may display a preview of the modified images overlaid on the images of the real world environment in real time, processed by the image signal processor 203. The control unit 201 further sends instructions to, algorithmically detect a face within the modified images for example, by detecting and assessing feature reference points of one or more objects within the modified images, and algorithmically track the detected face within the modified images for example, by aligning the feature reference points of the detected face across the modified images to preview face images in real time overlaid on the images of the real world environment. The face images is controlled for interaction with the images of the real world environment either by user control or may be controlled automatically by instructions stored in the control unit's 201 memory.

Further, the control unit 201 may receive instructions during gameplay, stored in the memory, to further process the images of the real world environment for recognition of one or more objects by detecting and assessing feature reference points of objects in the images of the real world environment to determine whether or not the detected objects are accepted or rejected. If the objects are not detected, assessing feature reference points of the objects in the images of the real world environment until objects are detected. If objects are detected, mapping the detected objects feature reference points and establishing a point by point correspondence between the detected object and an exemplar database of references stored in the memory, for the recognition of the detected objects in the images of the real world environment. The recognition of objects in the images of the real world environment may execute the display of one or more graphics which may be partially overlaid on the images of the real world environment, and the graphics are controlled by instructions stored in the memory to interact with the face images and the images of the real world environment. While the present embodiment describes a method for recognition of objects, it is to be understood by one skilled in the art, that other methods may be utilized for object recognition such as, feature-detection methods like corner detection, edge detection, blob detection and/or other image processing methods.

It should be noted, the modified images may be processed for a variety sizes, for example, smaller than the game environment, and for a variety of shapes for example, oval, circle, square, or any other shape, and further may be partially or fully enclosed within an opaque, semi-transparent, or transparent graphic(s), or the modified images may be embedded in/or within a graphic or embedded in/or within the game environment, for example, depending on the gameplay and the mobile computing device's screen orientation. Lastly, the modified images and the images of the real world environment may be processed to generate combined images for display. It should be further noted, the images of the real world environment processed as disclosed herein, may be 3D images of a real world environment and spherical images of a real world environment from one or more rear image sensors.

Furthermore, in response for failing to detect a face, the algorithm may continue to assess feature reference points of one or more objects within the modified images by instructions stored in the mobile computing device's memory, for a preview of one or more objects within the modified images in real time overlaid on the game environment until a face is detected and further the modified images may be controlled for interaction with the game environment by the user control or automatically by instructions stored in the memory.

While the present embodiment describes a method for the algorithmic facial detection and tracking, it is to be understood by one skilled in the art, that a variety of methods may be utilized for facial detection and facial tracking inclusive of, but not limited to, KLT algorithm method, appearance based methods, Viola-Jones method, image pattern method, and intensity based algorithms.

Figure 9:
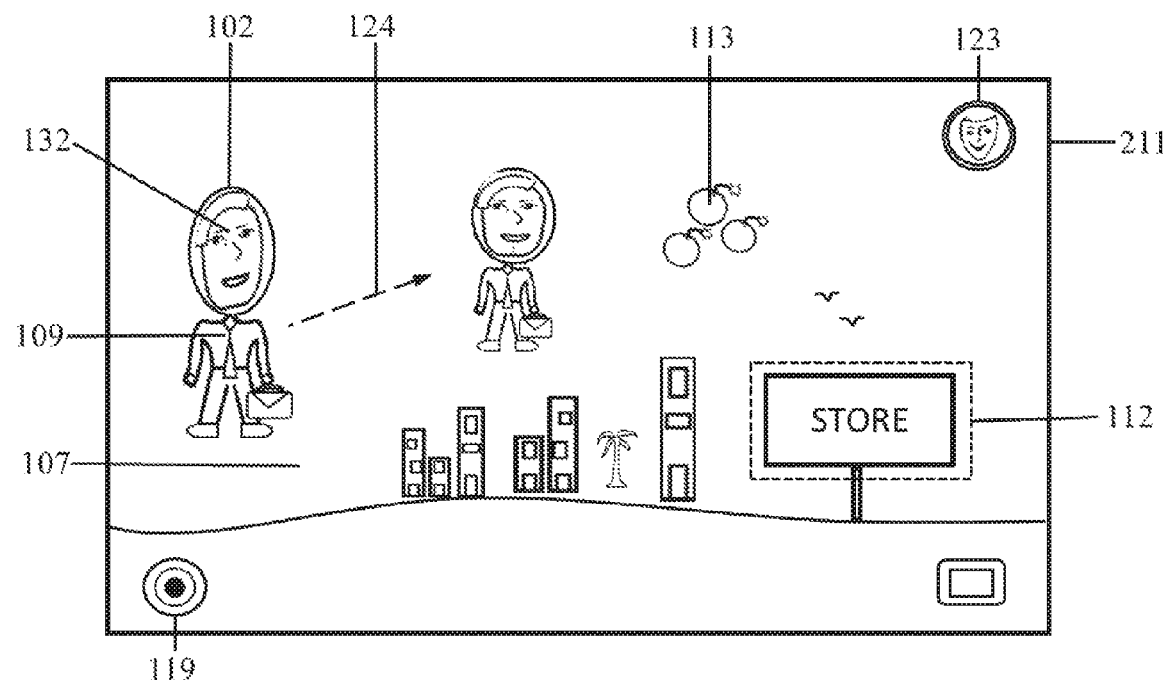
FIG. 9 illustrates face images interacting with the images of the real world environment, the recognition of an object in the images of a real world environment during gameplay according to one or more embodiments of the present invention.

FIG. 9 this embodiment illustrates a preview of face images overlaid on images of a real world environment and the recognition of an object during gameplay. In this example, the mobile computing device has received instructions to display a preview of face images 102 overlaid on images of a real world environment 107 in real time for example, on the touchscreen 211. The images of the real world environment 107 provide a live view of the user's environment from the user's perspective, in this example a city, inclusive of real world objects. Further in this example, the mobile computing device has received instructions, requested by the user, or may be requested automatically, for recognition of one or more objects 112 in the images of the real world environment 107. In this instance, the algorithmically recognized object 112 is an advertising billboard, the recognition of which displays one or more corresponding graphics, for example an avatar graphic 109, retrieved from the mobile computing device's memory, or may be retrieved from one or more host processors or in one or more network servers. The retrieved avatar graphic 109, displayed attached to the face images 102, may be partially overlaid on the images of the real world environment 107. It should be noted, the present disclosure described in one or more embodiments may be referred to as augmented reality (AR) which may be a real-time live direct or indirect view of the physical real world environment from the user's perspective whose elements are augmented or supplemented by computer generated sensory input such as, graphics, video, sounds, and GPS data.

The displayed avatar graphic 109 attached to the face images 102 is controlled, by at least one user or alternatively may be controlled automatically by instructions stored in the memory, to interact with the images of the real world environment 107. During gameplay for example, the face images 102 attached to the avatar graphic 109 may be moved, repositioned, and resized by control of a user, or automatically, for example, to avoid collision or to collide with graphics 113. The user may control the face images 102 by performing simple or multi-touch gestures or utilizing a stylus, on the mobile computing device's touchscreen 211 to interact with the images of the real world environment 107. Alternatively, by utilizing the mobile computing device's gyroscope/accelerometer sensors, the user may control the face images 102 by tilting and/or rotating the mobile computing device to interact with the images of the real world environment 107. Further, the user may control the face images 102 by for example, selecting gesture controller functionality 123, to perform one or more facial and/or head gestures for the execution of commands to control the face images 102 to interact with the images of the real world environment 107.

Further in this instance, gameplay comprises user control of movement, positioning, sizing, and etc. of the face images 102 to interact with the images of the real world environment 107 and graphics. The algorithmically recognized object 112, the advertising billboard, in the images of the real world environment 107, may also display one or more graphics 113, for example bomb graphics, which may be controlled by instructions stored in the mobile computing device's memory, to interact with face images 102 and the images of the real environment 107. During gameplay, the displayed bomb graphics 113 may be moved and positioned by automatic control, to present challenges and/or obstacles to the face images 102 attached to the avatar graphic 109.

Further during gameplay, the user selected the gesture controller functionality 123 for the execution of one or more commands to control the face images 102 attached to avatar graphic 109 overlaid on the images of the real world environment 107. In this instance, the accepted user performed gesture 132 depicted as a left tilt head gesture, has executed one or more commands 124, represented as an arrow in this example, to control, through the accepted user performed gesture 132, the face images 102 attached to the avatar graphic 109 for interaction with the images of the real world environment 107 and graphics 113 during gameplay. For example, the executed commands comprise movement, positioning, and sizing of the face images 102 attached to the avatar graphic 109 to presumably avoid collision or to collide against one or more graphics 113 and to interact with the images of the real world environment 107. Further, the executed command may display variety of graphics partially overlaid, such as the bomb graphics, stored in the mobile computing device's memory or which may be stored in one or more network servers, to, for example, interact with the face images 102 and with the images of the real world environment 107.

Additionally, this embodiment illustrates a record functionality 119, requested by the user, or may be requested automatically by instructions stored in the mobile computing device's memory. The user selected record functionality 119 sends a command to the mobile computing device to initiate, video recording of real time images from the front image sensor and from the rear image sensor, simultaneously or with a time difference, initiate audio recording utilizing the mobile computing device's microphone. Further, the video recording of the real time images comprises the face images 102 overlaid on the images of the real world environment 107, displayed on for example, the touchscreen 211. Additionally, the video recording may record gameplay, such as the face images 102 interacting with the images of the real world environment 107 which may include one or more graphics 113, one or more avatar graphics 109, and etc. The video recording may be terminated by a user request, or by a request automatically, for example by the user re-selecting the record functionality 119 to send a command to the mobile computing device to store the video recording in mobile computing device's memory, or alternatively the video recording may be stored in one or more network servers or one or more host processors utilizing the mobile computing device's communication module for connection to the internet or an LAN for transmission of the recorded video to the network server(s) or host processor(s). Furthermore, it should be noted, the face images interaction with the images of the real world environment as described herein should not be so limited, and are merely examples provided.

It should be noted, that the mobile computing device's touchscreen control, gyroscope/accelerometer control, and gesture control are merely examples of an input device for control of the aforementioned, and a variety of methods and/or input devices may be used as disclosed previously in one or more embodiments.

Figure 10:
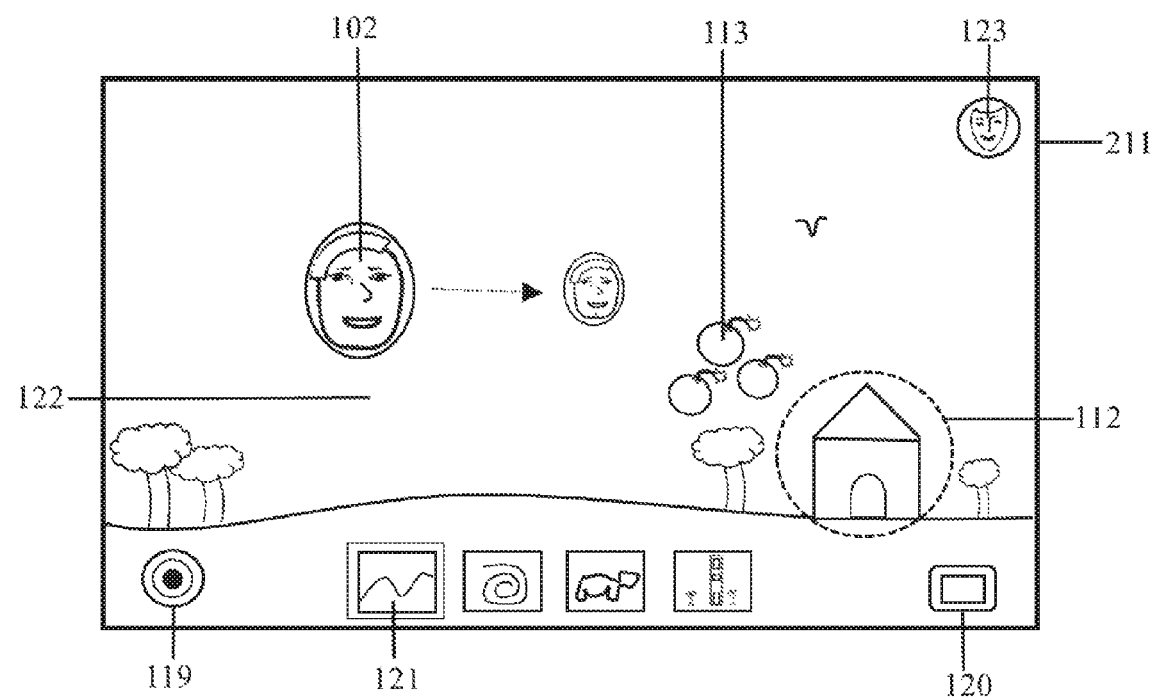
FIG. 10 illustrates face images interacting with a preexisting video, recognition of an object in the preexisting video according to one or more embodiments of the present invention.

FIG. 10 illustrates a preview of face images overlaid on a preexisting video with the recognition of an object during gameplay. In this example, the game environment is comprised of one or more preexisting videos. The video library functionality 120 is user selected, or may be selected automatically by instructions stored in the mobile computing device's memory, for the mobile computing device to receive a command to provide one or more preexisting videos of one or more objects stored in the memory, or which may be stored in one or more network servers or one or more host processors, permitting the user to select a desired preexisting video 121. The mobile computing device receives instructions and may process the user selected preexisting video 121 to fit desired characteristics for display, for example resolution, image effects, filtering, aspect ratio, image scaling, automatic exposure (AE), noise reduction, high dynamic range (HDR), and etc. The mobile computing device displays a preview of face images 102 in real time overlaid on the preexisting video 122, on a screen, for example the touchscreen 211. The mobile computing device may initiate the speakers for audio output of the preexisting video 122.

Further in this example, the face images 102 is controlled, either by at least one user or automatically by instructions stored in the memory, to interact with the preexisting video 122. During gameplay, the face images 102 for example, has been moved, repositioned, and resized to interact with the preexisting video 122. Further, the embodiment illustrates a recognized object 112 in the preexisting video 122, the algorithmically recognized object 112 is a house, the recognition of which displays one or more corresponding graphics 113, for example an explosion graphic, retrieved from the mobile computing device's memory or retrieved from one or more host processors or in one or more network servers, and which may be partially overlaid on the preexisting video 122, displayed on for example the touchscreen 211. The displayed explosion graphics 113 may be controlled by instructions stored in the mobile computing device's memory, to interact with the face images 102 and/or the preexisting video 122. During gameplay, the displayed explosion graphics 113 is, for example, moved and positioned by automatic control, to present challenges and/or obstacles to the face images 102. Further during gameplay, the face images 102 has been moved, repositioned, and resized by user control presumably to avoid collision or to collide with the explosion graphics 113 and to interact with the preexisting video 122. It should be noted, the representation of the graphics and the interaction described in this instance are merely examples and the graphics may be any shape or form and additionally may be animated.

Additionally, this embodiment illustrates a record functionality 119, requested by the user, or may be requested automatically by instructions stored in the mobile computing device's memory. The user selected record functionality 119 sends a command to the mobile computing device to initiate, video recording of real time images from the front image sensor and recording of the preexisting video, simultaneously or with a time difference, initiate audio recording utilizing the mobile computing device's microphone. Further, the video recording of the real time images comprises the face images 102 overlaid on the preexisting video 122, displayed on the screen for example, the touchscreen 211. Additionally, the video recording may record interaction, such as the face images 102 interacting with the preexisting video 122 which may include one or more graphics 113, one or more avatar graphics, and etc. The video recording may be terminated by a user request, or by a request automatically, for example the user reselecting the record functionality 119 to send a command to the mobile computing device to store the video recording in mobile computing device's memory or may be stored in a network server or host processor utilizing the mobile computing device's communication module for connection to the internet or an LAN for transmission of the recorded video to one or more network servers or one or more host processors.

Figure 11:
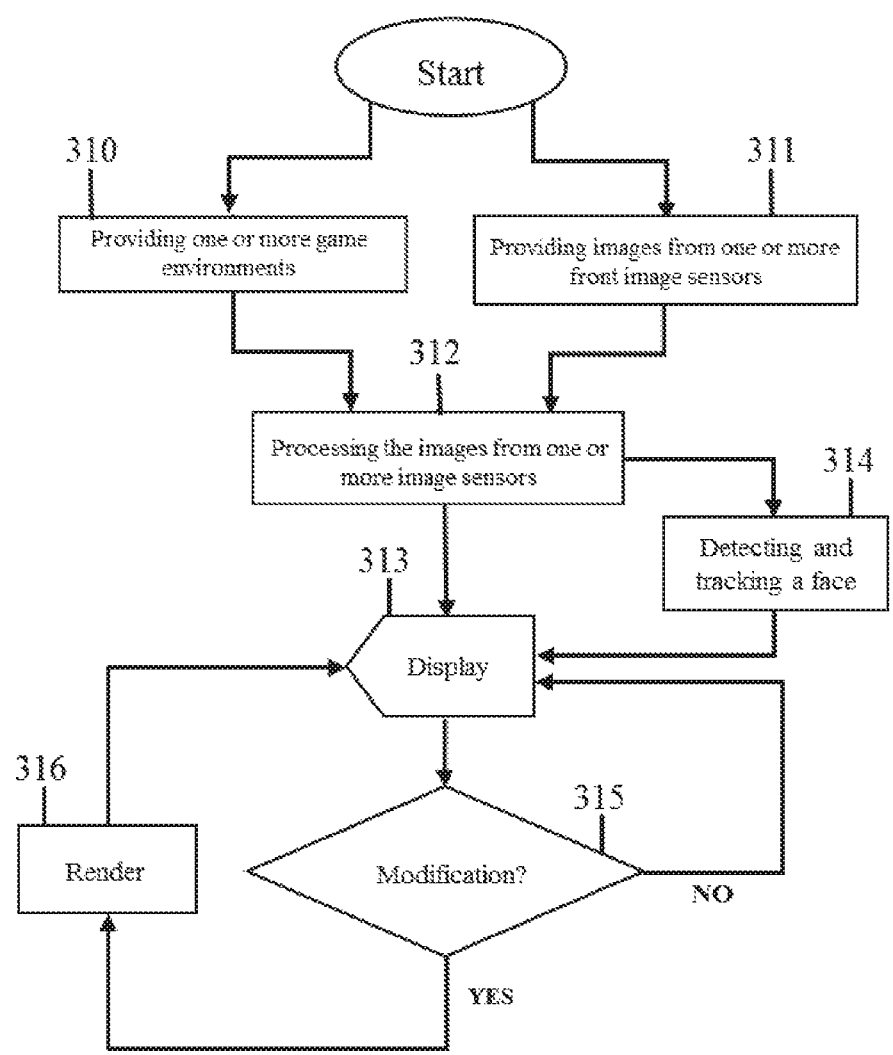
FIG. 11 is a flowchart diagram illustrating a method for an interactive image based game for previewing images of a face to interact with a game environment according to one or more embodiments of the present invention.

FIG. 11 is a flowchart diagram illustrating a method for interactive image based game for previewing images of a face to interact with a game environment according to one or more embodiments of the present invention. In step 310, the mobile computing device receives instructions stored in a memory, providing one or more game environments comprising images, alternatively the mobile computing device may receive instructions to provide the one or more game environments comprising images of a real world environment from one or more rear image sensors, or may provide one or more game environments comprising one or more preexisting videos. In step 311, the mobile computing device receives instructions, stored in the memory, providing images of one or more objects from one or more front image sensors, such as a real time video or real time image frames. In step 312, the mobile computing device further receives instructions to process the images from the front image sensor to generate modified images of a certain size and a certain shape such that a face may be detected and tracked within the generated modified images, to fit desired characteristics for display of the modified images, such as automatic focusing (AF), quality, size, resolution, etc., and may overlay the generated and processed modified images onto the game environment for display on a screen as disclosed in one or more embodiments of the present invention, notably in FIG. 3, and FIG. 8.

In step 313, displaying a preview of the modified images in real time overlaid on the game environment on the screen of the mobile computing device. In step 314, algorithmically detecting a face within the modified images by, for example, detecting and assessing feature reference points of one or more objects within the modified images, and algorithmically tracking the detected face within the modified images by, for example, aligning the feature reference points of the detected face across the modified image frames to preview face images in real time overlaid on the game environment displayed on the screen, as disclosed in previous embodiments of the present invention, notably in FIG. 3 and FIG. 8, It should be mentioned as disclosed in FIG. 3, if the detected object is rejected as a face, the algorithm may continue to assess feature reference points of the objects within the modified images to preview object images in real time until a face is detected.

In step 315, at any point in time during the game, one or more modifications made by at least one user, or automatically by instructions stored in the memory, allow the rendering of scenes in real time of the game. In step 316, when the modification is detected, for example, a movement of the face images caused by a touch gesture on the touchscreen, or a command to display certain graphics, information of the detected modification is sent to the mobile computing device's central processing unit and/or graphics processing unit for the real-time rendering of one or more scenes, in response to the detected modification, and display in real time the rendered scenes on the screen. If modifications are not detected, the game may display the same scene until such modifications are detected requiring a real time rendering of the scenes.

Figure 12:
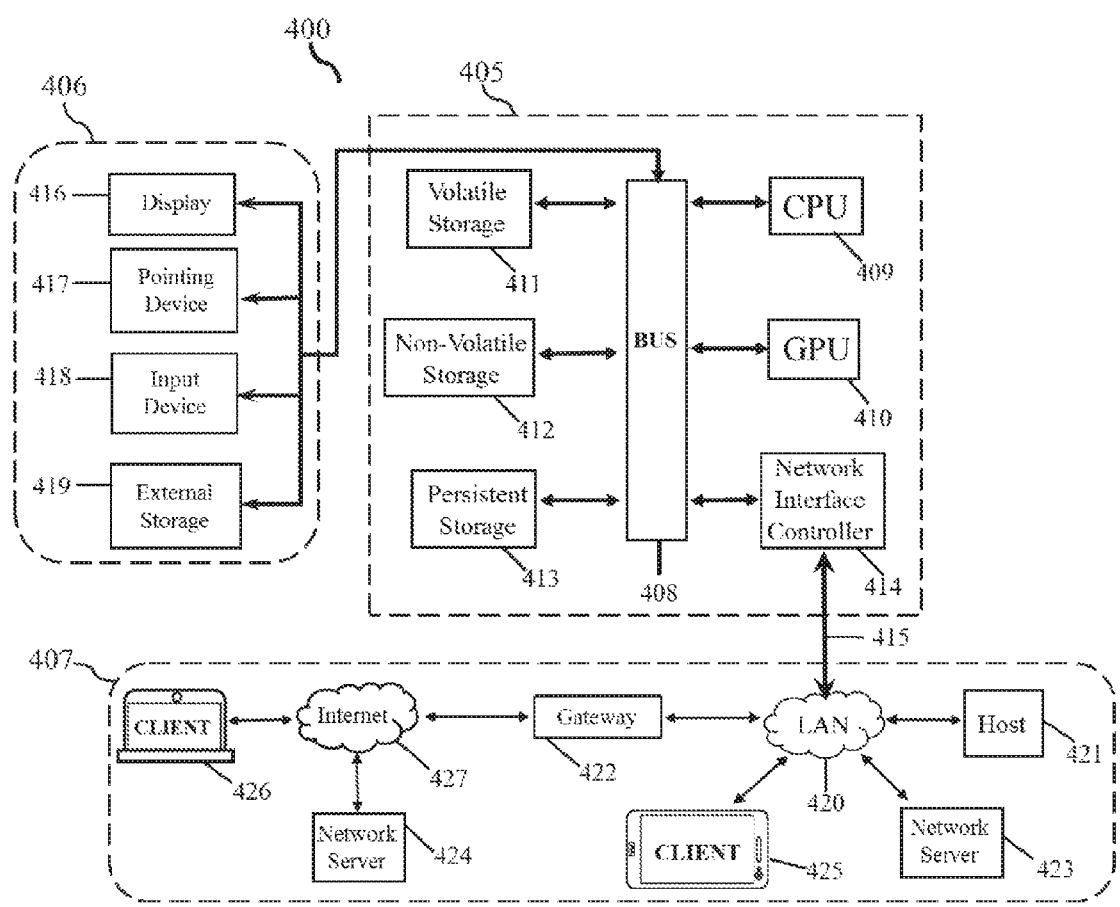
FIG. 12 illustrates an exemplary embodiment of a computer system which the techniques described herein may be implemented.

FIG. 12 illustrates a computer system 400 upon which various embodiments of the concepts of the invention herein described may be implemented comprising a computer platform 405 peripheral devices 406 and shared network resources 407.

The computer platform 405 is comprised of a bus 408 or other connectors or set of wires allowing the communication of information and data, the transfer of information and data among a variety of parts and components inside a computing platform 405 or between computers. The central processing unit 409 coupled with the bus 408, is the electronic circuitry within a computing device allowing processing of information, interpreting, and carrying out instructions and/or tasks. The graphics processing unit 410 coupled with the bus 408, is used for quickly manipulating and altering memory allowing the acceleration of images created in a frame buffer for output to a display screen. The volatile memory 411, for example a random access memory, static RAM, or dynamic RAM coupled with the bus 408 stores information, data, and instructions for the execution by the central processing unit 409, and may further be used for temporary storage and working space for an operating system and software applications. The mobile computing device platform 405 may also include non-volatile memory 412, such as a read only memory (ROM) or erasable programmable read-only memory (EPROM), or any other static storage device coupled to the bus 408 and is used for storing firmware, which is a type of software that provides the control, monitoring, and data manipulation of the computing device, and also used for basic input-output system (BIOS). The persistent storage 413, sometimes referred to as non-volatile storage, a solid-state drive, magnetic disk, or optical disk, and is coupled to the bus 408 providing the storing of information and storing of instructions. The computing device platform 405 coupled via bus 408 to the peripheral input devices 406, includes a display 416, which may be a touchscreen display, liquid crystal display (LCD), plasma display, and cathode ray tube (CRT) for displaying information and visual images to the user of the computer platform 405.

The peripheral input devices 406 including a pointing device 417, which may be referred to as a cursor device, coupled to the bus 408, which may be a mouse, joystick, touchpad, directional pad, touchscreen control unit, pointing stick, stylus, track point, or trackball, for the user to input spatial data by controlling pointing device's 417 movement, shown on the computing device's display 416, for communicating command signals, command selections, and information to central processing unit 409. This pointing device 417 typically allows for movement in two axes, (eg. X, Y) in a coordinate plane, allowing the pointing device 417 to specify positions in the coordinate plane. The display 416 such as a touchscreen may detect the user's touch gestures to a relative position and send the information based on user's touch gestures via bus 408 to the central processing unit 409. Another kind of input device 418, typically referred to as an alphanumeric keyboard, is coupled to bus 408, and is comprised of letters, numbers, symbols and/or keys for communicating command signals, command selections, and information to the central processing unit 409. The external storage 419 may be coupled to the computing device platform 405, via bus 408, provides additional and/or removable storage enabling the sending and/or receiving of information and data to one or more computer systems, and may additionally act as a data back-up for the computing device platform 405.

According to the embodiment of the invention, the techniques herein described relate to the use of a computer system 400 for implementing the techniques herein described. According to one embodiment of the invention, the techniques herein described are performed by the computer system 400 according to information and data received from the central processing unit 409 for executing instructions, such as executable code, for executing one or more of sequences of one or more instructions stored in the volatile memory 411. Wherein, instructions such as executable code, may be read into volatile memory 411 for example, from another computer-readable medium memory allowing the central processing unit 409 to execute one or more sequences of instructions to process the steps for the execution of the invention described herein. The embodiments of the invention described herein are not limited to any kind of specific combination of hardware and/or software.

Wherein the term computer-readable medium, as used herein, is intended to refer to any machine readable medium that partially, occasionally, and/or continually participates in providing instructions to the central processing unit 409 and/or instructions to the computer graphics processing unit 410 to carry out the instructions for the implementation of the techniques herein described. Computer-readable mediums, may take a variety of forms such as, volatile media and non-volatile media. For example, volatile storage may include RAM (random access memory), static random-access memory (SRAM), and dynamic random access memory (DRAM). Wherein non-volatile storage comprises an optical disk or magnetic disk such as persistent storage 413, and, further comprises read-only memory (ROM) for example, an erasable programmable read-only memory (EPROM), a programmable read-only memory (PROM), an electrically erasable programmable read-only memory (EEPROM)), and a flash EEPROM memory. Further, standard and various forms of computer readable-mediums may include a flash memory, optical disks for example a CD-ROM and a digital versatile disc (DVD), a ferroelectric RAM (F-RAM), a hard disk drive, a floppy disk, a magnetic recording tape, a memory card, a memory cartridge, and methods such as paper tape and punch cards or any other medium a computer is able to read. Different forms of computer-readable media and/or a combination of different forms of computer-readable media may participate in carrying one or more sequences of one or more instructions to the central processing unit 409 allowing for the execution of the one or more instructions. Further, it should be noted, that the one or more sequences of one or more instructions needed for the execution of the invention may be downloaded into the computer platform 405 via the internet utilizing a variety of communication protocols.

The present disclosure illustrates embodiments for implementation of the invention on a computing device such as a mobile computing device, that allows for the saving and storage of an images, data, databases, instructions, information, and executable code in the memory. The executable code for utilizing the invention herein described reside on the computing device's memory, permitting the invention herein described to be executed by said computing device's central processing unit and/or graphics processing unit utilizing the executable code.

The computer platform 405 also includes a network interface controller, sometimes referred to as network interface card, network adapter, and LAN adapter, connected to a bus 408 allowing the computer platform 405 to connect to a computer network for interface with one or more host processors or one or more network servers supporting multiple receive and transmit queues, and allowing the computer platform 405, to send and receive data and requests comprising program code, instructions, or software, and further allowing the host processors or network servers to send and receive data and requests for an application program running on the computer platform 405, through the internet, LAN network, and communication interface.

The computer platform includes a communication interface, such as a network interface controller 414 coupled to the bus 408, providing a transfer of data and information to and from a coupled link layer 415 that is coupled to a local area network (LAN) 420. For example, the wireless link also commonly referred to as WI-FI and the 802.11 family, comprised of 802.11a, 802.11b, 802.11g, and a wireless link such as, Bluetooth may also be used for network connection and network implementation. An additional example of the communication interface 414 may be a local area network interface (LAN NIC) providing for the transfer of data and information to and from a compatible LAN. As stated above, communication interface 414 sends and receives electrical signals, electromagnetic signals, or optical signals that carry digital data streams. The link layer 415 provides for the transfer of data and information via one or more networks providing access to other shared resources. For example, network link 415 may provide a connection through local area network 420, a network server 423, a host computer 421, or a client 425.

Additionally, the computer platform 405 may connect via link layer 415, and via a connection to a gateway 422 or, a firewall, to connect to the internet 427 allowing access to shared resources located on the internet 427 inclusive of a network server 424 and/l or network storage. It should be noted, the computer platform 405 may be accessible to clients and accessed by clients located anywhere on the internet 427 and/or the local area network 420. The network client 425 and network client 426 may include computing devices and mobile computing devices, such as a smartphone, a tablet computer, a laptop computer, a notebook computer, personal media user (PMP), head mount device, a personal digital assistant (PDA), a portable gaming device, a game console, a desktop computer, or any other similar electronic device. It should be noted, the network clients 425 and 426 may be implemented based on a similar computer platform such as the computer platform 405. Additionally, both local area network 420 and the internet 427 both utilize electrical signals, electromagnetic signals, or optical signals to carry digital data streams. Wherein the aforementioned signals refer to example forms of the carrier waves utilized for transporting digital data streams via a variety of networks and signals on the link layer 415 and through the communication interface 414, allowing digital data streams to be carried to and from the computer platform 405.

Data and messages, inclusive of instructions, information, program code and/l or executable code are sent and received by the computer platform 405, via a variety of network(s) inclusive of communication interface 414, local area network 420, and the internet 427. In the diagram herein illustrated, the computer platform 405 may act as network server, and may transmit a digital data stream comprised of a request of data or a request of code, or request for a database, or a request for access to a database(s) for an application program, running on clients 425 and/or 426. Wherein said requested information is carried through, as specified earlier, via the internet 427, the gateway or firewall 422, local area network 420 and the communication interface 414. Likewise, the computer platform 405 may request data comprising a request of code, database, and/or a request for accessibility to database(s) from other network resources. The received data, code, and/or databases(s) may be executed by the central processing unit 409 as it is received, and/or stored the in the volatile storage 411 and/or persistent storage 413 or in other non-volatile storage mediums for future execution by the central processing unit 409.

Furthermore, those skilled in the art will appreciate that numerous and different software, firmware, hardware, and/or a combination thereof, may be appropriate for practicing the present invention. The described software may be implemented in numerous programming languages and/or scripting languages including, but not limited to, C/C++, Java, Objective-C, perl, shell, PHP, and any known or future developed programming language or scripting language. Further, programming languages and/or scripting languages may be created, written, and/or assembled in or any order or structure suitable for the implementation of the invention herein.

It should be understood by one skilled in the art the implementation of the invention herein described and the processes and techniques herein detailed are not inherently related to any one particular apparatus or computing device and the invention herein described may be implemented utilizing a variety and/or combination of suitable components. Various aspects and/or components of the described embodiments may be used singly or in any combination in the systems and methods for the present invention. As mentioned prior, a variety of computing devices may be utilized, in line with, and true to the scope and spirit of, the invention herein described. Further, the present invention described herein should not be so limited to the examples and illustrations herein provided, and may be utilized, practiced, or implemented in a variety of ways, for example in social media networks, as a productivity tool application, and in video-telephony products. It is intended that the specification and examples be considered as exemplary only, with a true scope and spirit of the invention being indicated by the following claims.

The invention claimed is:

1. A computer implemented method for an interactive image based augmented reality game that uses images of a face to interact with a game environment, the method comprising the steps of:
   providing a mobile computing device comprising a memory, a screen, one or more front facing image sensors on a first side of the mobile computing device and one or more rear facing image sensors on a second side of the mobile computing device opposite the first side;
   receiving images of a real world environment from the one or more rear facing image sensors;
   generating, by the mobile computing device, a game environment comprising images of the real world environment;
   receiving images of one or more objects from the one or more front facing image sensors;
   processing, by the mobile computing device, the images of the one or more objects to generate modified images of a certain size and certain shape;
   overlaying, by the mobile computing device, the modified images onto the game environment;
   displaying, on the screen, a preview of the modified images overlaid on the game environment in real time;
   algorithmically detecting, by the mobile computing device, a face within the modified images and
   tracking the detected face within the modified images to preview face images in real time overlaid on the game environment;
   algorithmically recognizing, by the mobile computing device, one or more real world objects in the game environment;
   wherein each recognized real world object corresponds to one or more graphics stored in the memory;
   displaying on the screen the corresponding graphics overlaid on the game environment; and
   controlling the position of the face images to interact with the overlaid graphics and the game environment during gameplay.

2. The computer implemented method of claim 1: wherein the step of controlling the position of the face images is performed by at least one user or by instructions stored in the memory.

3. The computer implemented method of claim 1, wherein one or more avatar graphics are stored in the memory, the method further comprising the steps of:
   displaying the one or more avatar graphics attached to the face images overlaid on the game environment; and
   controlling the one or more avatar graphics attached to the face images to interact with the overlaid graphics and the game environment.

4. The computer implemented method of claim 1, further comprising the steps of:
   providing an exemplar database of references stored in the memory;
   acquiring a user performed gesture from the one or more front facing image sensors;
   comparing the user performed gesture to the exemplar database of references; and
   accepting the user performed gesture as a command for control of the face images; and
   the step of controlling the position of the face images is performed through the accepted user performed gesture.

5. The computer implemented method of claim 1, further comprising the steps of:
   receiving a command to video record the face images overlaid on the game environment;
   video recording the face images overlaid on the game environment in response to the command; and
   storing the video recording in the memory.

6. A computer system comprised of a central processing unit and a memory, the memory storing instructions for a mobile computing device to perform actions comprising:
   receiving images of a real world environment from one or more rear facing image sensors of the mobile computing device;

generating a game environment comprising images of the real world environment;

receiving images of one or more objects from one or more front facing image sensors of the mobile computing device;

generating modified images of a certain size and certain shape by processing the images of the one or more objects from the one or more front facing image sensors;

overlaying the modified images onto the game environment;

displaying on a screen of the mobile computing device a preview of the modified images overlaid on the game environment in real time;

algorithmically detecting a face within the modified images;

tracking the detected face within the modified images to preview face images in real time overlaid on the game environment;

algorithmically recognizing one or more objects in the images of the real world environment, wherein each recognized object corresponds to one or more graphics stored in the memory;

displaying on the screen of the mobile computing device the one or more graphics overlaid on the game environment; and controlling the position of the face images to interact with the one or more graphics and the game environment during gameplay.

7. The system of claim 6, wherein the memory further stores instructions for:

displaying one or more avatar graphics stored in the memory attached to the face images overlaid on the game environment; and controlling the avatar graphic attached to the face images to interact with the game environment.

8. The system of claim 6, wherein the memory further stores instructions for:

providing an exemplar database of references stored in the memory;

acquiring a user performed gesture from the front facing image sensor;

comparing the user performed gesture to the exemplar database of references; and accepting the user performed gesture as a command for control of the face images; and controlling the face images through the accepted user performed gesture.

9. The system of claim 6, wherein the memory further stores instructions for:

receiving a command to video record the face images overlaid on the game environment;

video recording the face images overlaid on the game environment in response to the command; and storing the video recording in the memory.

10. A computer implemented method for real time processing of images of a user's face and images of a real world environment for interaction, the method comprising the steps of:

a) providing a mobile computing device comprising an image signal processor, a memory, one or more front facing image sensors, one or more rear facing image sensors and a screen;

b) employing the mobile computing device to provide images of a real world environment received from the one or more rear facing image sensors;

c) employing the mobile computing device to provide images of one or more objects received from the one or more front facing image sensors;

d) employing the image signal processor to process the images of the one or more objects to generate modified images of a certain size and certain shape;

e) employing the image signal processor to overlay the modified images onto the images of the real world environment;

f) employing the mobile computing device to display on the screen a preview of the modified images overlaid on the images of the real world environment in real time;

g) employing the mobile computing device to algorithmically detect a face within the modified images and to track the detected face within the modified images to preview face images overlaid on the images of the real world environment in real time;

h) employing the mobile computing device to algorithmically recognize one or more objects in the images of the real world environment, wherein each recognized object corresponds to one or more graphics stored in the memory;

i) displaying on the screen the corresponding graphics overlaid on the images of the real world environment; and j) controlling the position of the displayed face images to interact with the displayed graphics and the images of the real world environment during gameplay.

* * * * *